(12) United States Patent
Roberts et al.

(10) Patent No.: US 9,062,228 B2
(45) Date of Patent: Jun. 23, 2015

(54) AQUEOUS INKJET INKS CONTAINING POLYURETHANE BINDERS WITH COMPONENTS TO INTERACT WITH CELLULOSE

(71) Applicant: E I DU PONT DE NEMOURS AND COMPANY, Wilmington, DE (US)

(72) Inventors: C Chad Roberts, Hockessin, DE (US); Christian Jackson, Wilmington, DE (US); Patrick F McIntyre, West Chester, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 377 days.

(21) Appl. No.: 13/729,378

(22) Filed: Dec. 28, 2012

(65) Prior Publication Data
US 2013/0182032 A1 Jul. 18, 2013

Related U.S. Application Data

(60) Provisional application No. 61/581,765, filed on Dec. 30, 2011.

(51) Int. Cl.
| | |
|---|---|
| *B41J 2/01* | (2006.01) |
| *C09D 175/04* | (2006.01) |
| *C09D 11/10* | (2014.01) |
| *C08G 18/48* | (2006.01) |
| *C08G 18/50* | (2006.01) |
| *C08G 18/75* | (2006.01) |
| *C08G 18/76* | (2006.01) |
| *C08G 18/08* | (2006.01) |
| *C08G 18/34* | (2006.01) |
| *C08G 18/38* | (2006.01) |

(52) U.S. Cl.
CPC .......... *C09D 175/04* (2013.01); *C08G 18/4854* (2013.01); *C08G 18/5024* (2013.01); *C08G 18/755* (2013.01); *C08G 18/7621* (2013.01); *C08G 18/765* (2013.01); *C08G 18/0819* (2013.01); *C08G 18/0866* (2013.01); *C08G 18/348* (2013.01); *C08G 18/3848* (2013.01); *C08G 18/3872* (2013.01)

(58) Field of Classification Search
None
See application file for complete search history.

(56) References Cited

U.S. PATENT DOCUMENTS

| | | |
|---|---|---|
| 3,479,310 A | 11/1969 | Bayer |
| 4,108,814 A | 8/1978 | Reif et al. |
| 4,408,008 A | 10/1983 | Markusch |
| 4,597,794 A | 7/1986 | Ohta et al. |
| 5,022,592 A | 6/1991 | Zakheim et al. |
| 5,026,427 A | 6/1991 | Mitchell et al. |
| 5,085,698 A | 2/1992 | Ma et al. |
| 5,231,131 A | 7/1993 | Chu et al. |
| 5,554,739 A | 9/1996 | Belmont |
| 5,679,138 A | 10/1997 | Bishop et al. |
| 5,891,231 A | 4/1999 | Guerlich et al. |
| 5,976,232 A | 11/1999 | Gore |
| 6,117,921 A | 9/2000 | Ma et al. |
| 6,262,152 B1 | 7/2001 | Fryd et al. |
| 6,306,994 B1 | 10/2001 | Donald et al. |
| 6,433,117 B1 | 8/2002 | Ma et al. |
| 6,627,761 B2 | 9/2003 | Klein et al. |
| 6,852,156 B2 | 2/2005 | Yeh et al. |
| 2003/0089277 A1 | 5/2003 | Zakheim et al. |
| 2007/0100023 A1 | 5/2007 | Burns et al. |
| 2008/0264298 A1 | 10/2008 | Burns |
| 2010/0143589 A1* | 6/2010 | Spinelli et al. ................ 427/256 |

FOREIGN PATENT DOCUMENTS

| | | |
|---|---|---|
| EP | 0556649 A1 | 8/1993 |
| WO | 2012/007254 A1 | 1/2012 |

OTHER PUBLICATIONS

Machine Translation of JP 05-163450 A to Morisaka et al., published Jun. 29, 1993.*
EIC Structure Search, Mar. 3, 2015.*
Vora, Ankit et al., J. Coating Tech. Research, 7(4) pp. 409-417, 2010.

* cited by examiner

*Primary Examiner* — Vu A Nguyen
(74) *Attorney, Agent, or Firm* — John H. Lamming; Simon L. Xu

(57) ABSTRACT

Disclosed are aqueous inkjet inks containing a polyurethane ink additive as a binder. The binder contains a component capable of interacting with cellulose. Certain heterocycles having similar Hansen solubility parameters as cellulose were incorporated into the polyurethane binders. Prints from these inks have better durability and optical properties than similar additives that do not have the components capable of interacting with cellulose.

21 Claims, No Drawings

AQUEOUS INKJET INKS CONTAINING POLYURETHANE BINDERS WITH COMPONENTS TO INTERACT WITH CELLULOSE

CROSS REFERENCE TO RELATED APPLICATION

This application claims priority under 35 U.S.C. §119 from U.S. Provisional Application Ser. No. 61/581,765, filed Dec. 30, 2011 which is incorporated by reference in its entirety.

BACKGROUND OF THE DISCLOSURE

The present disclosure pertains to an inkjet ink, in particular to an aqueous inkjet ink comprising colorants and polyurethane ink additives which contain components that can interact with cellulose. These components include a heterocycle pendent and or terminal to the polymer chain.

Polymeric ink additives are common for inkjet ink. They are often included to improve the durability of the printed ink, and for adjustment of viscosity and other important ink properties, etc.

US patent application publication Nos. 20080264298 and 20070100023 disclose dispersants capable of interacting with calcium components present in many types of paper.

While inks based on aqueous dispersions with polyurethane additives have provided improved inkjet inks for many aspects of inkjet printing, a need still exists for improved inkjet ink formulations that provide good print quality and good jettability in particular when used in a thermal inkjet printhead. It is well known to those of ordinary skill in the art that thermal inkjet printheads have lower tolerance towards the addition of polymer additives on its jettability and reliability compared to piezo inkjet printheads. The present disclosure satisfies this need by providing compositions having improved print durability, while maintaining other aspects of the ink properties such as dispersion stability, long nozzle life and the like.

SUMMARY OF THE DISCLOSURE

An embodiment provides an aqueous inkjet ink comprising a colorant, an aqueous vehicle, and a polyurethane ink additive as a binder, wherein said polyurethane additive comprises at least one compound of the general structure of Formula I:

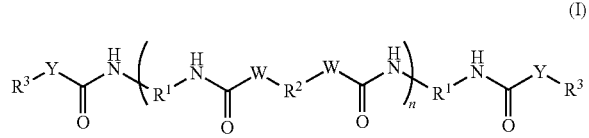

(I)

each Y is independently O, S or $NR^4$;
each W is N, O or S;
n is an integer from 2 to 30;
each $R^1$ is independently $C_1$-$C_{20}$ alkyl optionally substituted with one or more $R^5$, $OR^6$, $SR^6$ or $NR^7R^8$, or $C_6$-$C_{40}$ aryl optionally substituted with one or more $R^5$, $OR^6$, $SR^6$ or $NR^7R^8$;
each $R^2$ is comprised of difunctional isocyanate reactants $Z^1$, $Z^2$ and $Z^3$, wherein
$Z^1$ is a difunctional isocyanate reactant substituted with an aqueous dispersing ionic group, and $Z^1$ is present in between 5 to 40 weight percent of total weight of the polyurethane dispersant;

$Z^2$ is a difunctional or trifunctional isocyanate reactant selected from the group consisting of diol, diamine, amino alcohol, diamino alcohol, and amino dialcohol, and $Z^2$ is present in between 0 to 40 weight percent of total weight of the polyurethane dispersant; and
$Z^3$ is a difunctional isocyanate reactant substituted with $R^3$, and $Z^3$ is present in between 5 to 40 weight percent of total weight of the polyurethane dispersant; and
each $R^3$ is independently a monocylic or bicyclic heterocycle containing N, S or O atoms on the ring bonding via a carbon or heteroatom to Y or $Z^2$ either directly or via a linking group containing 1-10 carbon atoms, wherein said heterocycle is selected from the group consisting of imidazole, imidazolidinone, oxazolidinone, thiazolidinone, benzotriazole, benzimidazole, triazole, benzotriazole, thiazole, benzothiazole, pyrimidine, pyridazine, pyrrolidone and glycoside, and wherein the carbon atoms on the ring of said heterocycle are optionally substituted with one or more $R^5$, $OR^6$, $SR^6$ or $NR^7R^8$, and the N atom or atoms on the ring of said heterocycle are optionally substituted with $R^5$ or —$R^9OR^6$;
each $R^5$ is independently $C_1$-$C_{20}$ alkyl, $C_3$-$C_{20}$ cycloalkyl or $C_6$-$C_{40}$ aryl;
each $R^6$ is independently H, $C_1$-$C_{20}$ alkyl, $C_3$-$C_{20}$ cycloalkyl or $C_6$-$C_{40}$ aryl; and
each $R^7$ and $R^5$ are independently H, $C_1$-$C_{20}$ alkyl, $C_3$-$C_{20}$ cycloalkyl or $C_6$-$C_{40}$ aryl; and each $R^9$ is $C_1$-$C_5$ alkyl.

Another embodiment provides that $R^2$ further comprises $Z^4$, and $Z^4$ is a difunctional or trifunctional isocyanate reactant selected from the group consisting of a diol that contains a sulfone and a diamine that contains a sulfone.

Another embodiment provides that the polyurethane ink additive has an acid number (mg KOH per gram solid polymer) of at least 10 and at most 250.

Another embodiment provides that the polyurethane ink additive has a number average molecular weight of between 2,000 and 30,000 daltons.

Another embodiment provides that the colorant is a pigment.

Another embodiment provides that the colorant is a dispersed dye.

Another embodiment provides that the colorant is a self-dispersed pigment.

Another embodiment provides that the said self-dispersed pigment comprises anionic hydrophilic groups.

Another embodiment provides that the anionic hydrophilic groups are carboxyl groups.

Another embodiment provides that $R^3$ is independently a monocylic or bicyclic heterocycle.

Another embodiment provides that the heterocycle is oxazolidinone.

Another embodiment provides that the heterocycle is imidazole.

Another embodiment provides that the heterocycle is imidazolidinone.

Another embodiment provides that the heterocycle is thiazole.

Another embodiment provides that the heterocycle is pyridazine.

Another embodiment provides that the heterocycle is glycoside.

Another embodiment provides that the heterocycle is pyrrolidone.

Another embodiment provides an inkjet ink set wherein at least one of the inks in the inkjet ink set is comprised of a colorant, an aqueous vehicle, and a polyurethane ink additive as a binder, wherein said polyurethane additive comprises at least one compound of the general structure of Formula I:

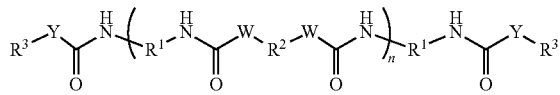

(I)

each Y is independently O, S or $NR^4$;
each W is N, O or S;
n is an integer from 2 to 30;
each $R^1$ is independently $C_1$-$C_{20}$ alkyl optionally substituted with one or more $R^5$, $OR^6$, $SR^6$ or $NR^7R^8$, or $C_6$-$C_{40}$ aryl optionally substituted with one or more $R^5$, $OR^6$, $SR^6$ or $NR^7R^8$;
each $R^2$ is comprised of difunctional isocyanate reactants $Z^1$, $Z^2$ and $Z^3$, wherein
$Z^1$ is a difunctional isocyanate reactant substituted with an aqueous dispersing ionic group, and $Z^1$ is present in between 5 to 40 weight percent of total weight of the polyurethane dispersant;
$Z^2$ is a difunctional or trifunctional isocyanate reactant selected from the group consisting of diol, diamine, amino alcohol, diamino alcohol, and amino dialcohol, and $Z^2$ is present in between 0 to 40 weight percent of total weight of the polyurethane dispersant; and
$Z^3$ is a difunctional isocyanate reactant substituted with $R^3$, and $Z^3$ is present in between 5 to weight percent of total weight of the polyurethane dispersant; and
each $R^3$ is independently a monocylic or bicyclic heterocycle containing N, S or O atoms on the ring bonding via a carbon or heteroatom to Y or $Z^2$ either directly or via a linking group containing 1-10 carbon atoms, wherein said heterocycle is selected from the group consisting of imidazole, imidazolidinone, oxazolidinone, thiazolidinone, benzotriazole, benzimidazole, triazole, benzotriazole, thiazole, benzothiazole, pyrimidine, pyridazine, pyrrolidone and glycoside, and wherein the carbon atoms on the ring of said heterocycle are optionally substituted with one or more $R^5$, $OR^6$, $SR^6$ or $NR^7R^8$, and the N atom or atoms on the ring of said heterocycle are optionally substituted with $R^5$ or —$R^9OR^6$;
each $R^5$ is independently $C_1$-$C_{20}$ alkyl, $C_3$-$C_{20}$ cycloalkyl or $C_6$-$C_{40}$ aryl;
each $R^6$ is independently H, $C_1$-$C_{20}$ alkyl, $C_3$-$C_{20}$ cycloalkyl or $C_6$-$C_{40}$ aryl; and
each $R^7$ and $R^8$ are independently H, $C_1$-$C_{20}$ alkyl, $C_3$-$C_{20}$ cycloalkyl or $C_6$-$C_{40}$ aryl; and each $R^9$ is $C_1$-$C_5$ alkyl.

Yet another embodiment provides a method of inkjet printing onto a substrate is provided, comprising, in any workable order, the steps of:
(a) providing an inkjet printer that is responsive to digital data signals;
(b) loading the printer with a substrate to be printed;
(c) loading the printer with the aqueous inkjet ink or inkjet ink set as set forth above; and
(d) printing onto the substrate using the aqueous inkjet ink or ink set, in response to the digital data signals to form a printed image on the substrate.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Unless it is otherwise stated or clear from the context, when discussing properties or components of an inkjet ink, the term "inkjet ink" may be understood to include inkjet ink sets.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "paper" means a semisynthetic product made by chemical processing of cellulosic fibers. The term paper also refers to the variety of paper used in printing such as copy paper, photo paper, newsprint, brochure paper and the like.

As used herein, the term "solubility parameter" provides a numerical estimate of the degree of interaction between materials, and can be a good indication of solubility, particularly for non polar materials such as many polymers.

As used herein, the term "dispersant" means a surface active agent added to a suspending medium to promote uniform and maximum separation of extremely fine solid particles often of colloidal size. For pigments, the dispersants are most often polymeric dispersants and usually the dispersants and pigments are combined using dispersing equipment.

As used herein, the term "structured polymer" means a polymer that is composed of segments that differ in composition from each other. Examples include diblock, triblock, graft and star polymers.

As used herein, the term "random polymer" means a polymer that is composed of monomers distributed in a random fashion in the polymer in much the same mole ratio of the monomers in the initial monomer composition.

As used herein, the term "ionically stabilized dispersions", ("ISD") are polymerically stabilized dispersions where the stabilization is due to ionic stabilization with little or no steric stabilization.

As used herein, the term "dispersible particles" are those particles that can be dispersed with dispersants including polymeric dispersants.

As used herein, the term "stable dispersion" means a dispersion of particles where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "P/D" means the pigment to dispersant weight ratio in the initial dispersion formulation.

As used herein, the term "ambient conditions" refers to surrounding conditions, which are often around one atmosphere of pressure, about 50% relative humidity, and about 25° C.

As used herein, the term "crosslinking" means the chemical reaction between reactive groups on at least two different chemicals, where one of the chemicals is at least disubstituted.

As used herein, the term "emulsion" means a stable mixture of two or more immiscible liquids held in suspension by small percentages of substances called emulsifiers.

As used herein, the term "miniemulsion" means dispersions of relatively stable oil droplets with a size in the 50 to 500 nanometer region prepared by shearing a system containing an oil, water, and a surfactant.

As used herein, the term "nonionic" means an oligomer or polymer derived from ethylene oxide and/or propylene oxide where there are at least 4 of the ethylene oxide or propylene oxide groups.

As used herein, the term "heterocycle" means a cyclic ring compound which consists of carbon atoms and at least one N, O, or S in the ring and contains 4-7 total atoms in ring.

The carbon atom(s) on the ring may optionally form carbonyl group(s).

As used herein, the term "ink additive" means a component added when the various inkjet ink components are combined to make an ink.

As used herein, the term "binder" means a film forming ingredient in the inkjet ink.

This binder is normally added when the ink is formulated and is considered a polymeric ink additive.

As used herein, the term "HSD" means High Speed Dispersing.

As used herein, the term "OD" means optical density.

As used herein, the term "color saturation" is defined as chroma normalized by lightness L*, in the CIELAB color space; this is:

$$s_{ab} = \frac{C_{ab}^*}{L^*}.$$

As used herein, the term "Gloss" means observation of reflected light from a printed surface, normally the printed substrate is glossy paper.

As used herein, the term "SDP" means "self-dispersible", "self-dispersing" or "self-dispersed" pigment.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight usually reported in daltons.

As used herein, the term "Mw" means weight average molecular weight usually reported in daltons.

As used herein, the term "Pd" means the polydispersity which is the weight average molecular weight divided by the number average molecular weight.

As used herein, the term "D50" means the particle size at which 50 Y % of the particles are smaller; "D95" means the particle size at which 95% of the particles are smaller.

As used herein, the term "cP" means centipoise, a viscosity unit.

As used herein, the term "conductivity" means the property of a substance or mixture that describes its ability to transfer electricity and is reported as mS/cm.

As used herein, the term "pre-polymer" means the polymer that is an intermediate in a polymerization process, and can also be considered a polymer.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethane dispersions described herein.

As used herein, the term "GPC" means gel permeation chromatography.

As used herein, the term "THF" means tetrahydrofuran.

As used herein, the term "TMXDI" means tetramethyl xylylene diisocyanate.

As used herein, Eternacoll® UH-50 is a polycarbonate diol from UBE Industries, Tokyo, Japan.

As used herein, the term "DMPA" means dimethylol propionic acid.

Denacol® 321 is trimethylolpropane polyglycidyl ether, a cross-linking reagent from Nagase Chemicals Ltd., Osaka, Japan.

As used herein, the term "DEA" means diethanolamine.

As used herein, the term "BMEA" means bis(methoxyethyl)amine.

As used herein, the term "Tetraglyme" means Tetraethylene glycol dimethyl ether.

As used herein, the term "PROXEL™ biocide" refers to a biocide obtained from Arch Chemicals, Norwalk, Conn.

As used herein, the term "Surfynol® 465" refers to surfactant from Air Products (Allentown, Pa. USA).

As used herein, the term "Glycereth-26" refers to a 26 mole ethylene oxide adduct of glycerin.

As used herein, the term "2-P (95/5)" refers to 2-Pyrrolidone supplied as a 5% water mixture.

Unless otherwise noted, the above chemicals were obtained from Aldrich (Milwaukee, Wis.) or other similar suppliers of laboratory chemicals.

Polyurethane Binder

A model for effective use of pigments in inkjet inks is that a pigment is held onto the surface of a substrate resulting high optical density and other desirable print properties. Examples of "holding" the pigment onto the surface include using a fixing agent that reacts or effects the pigment when it is jetted onto the substrate, using self-dispersing pigments, and using dispersants that are designed to interact with calcium as suggested in US Patent application publication Nos. 20080264298 and 200070100023, etc. Calcium carbonate is often a component of paper, especially for copy paper and similar papers used for inkjet printing.

While seeking new ways to obtain better durability of printed images from inkjet inks, a set of heterocycles was identified as capable of interacting with cellulose which is the predominant component in paper. These heterocycles were selected by matching their Hansen solubility parameters with that of cellulose. Inclusion of these heterocycles in polyurethanes provides the polyurethane binders of the present disclosure. While not being bound by theory, it is concluded that if a binder contains heterocycles that can interact with cellulose, the resulting inkjet inks will behave differently. Upon jetting on paper, the binder can bind to the paper to provide improved durability.

Accordingly, polyurethane binders having heterocyclic substituents capable of interacting with cellulose were prepared. In one embodiment, the polyurethane binder comprises at least one compound of the general structure of Formula I:

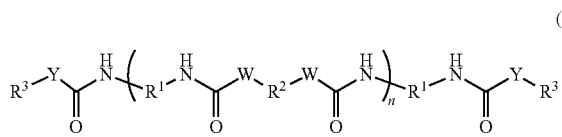

(I)

each Y is independently O, S or $NR^1$;
each W is N, O or S;
n is an integer from 2 to 30;
each $R^1$ is independently $C_1$-$C_{20}$ alkyl optionally substituted with one or more $R^5$, $OR^6$, $SR^6$ or $NR^7R^8$, or $C_6$-$C_{40}$ aryl optionally substituted with one or more $R^5$, $OR^6$, $SR^6$ or $NR^7R^8$ each $R^2$ is comprised of difunctional isocyanate reactants $Z^1$, $Z^2$ and $Z^3$, wherein $Z^1$ is a difunctional isocyanate reactant substituted with an aqueous dispersing ionic group, and $Z^1$ is present in between 5 to 40 weight percent of total weight of the polyurethane dispersant;

$Z^2$ is a difunctional or trifunctional isocyanate reactant selected from the group consisting of diol, diamine, amino alcohol, diamino alcohol, and amino dialcohol, and $Z^2$ is present in between 0 to 40 weight percent of total weight of the polyurethane dispersant; and $Z^3$ is a difunctional isocyanate reactant substituted with $R^3$, and $Z^3$ is present in between 5 to weight percent of total weight of the polyurethane dispersant; and each $R^3$ is independently a monocylic or bicyclic heterocycle containing N, S or O atoms on the ring bonding via a carbon or heteroatom to Y or $Z^2$ either directly or via a linking group containing 1-10 carbon atoms, wherein said heterocycle is selected from the group consisting of imidazole, imidazolidinone, oxazolidinone, thiazolidinone, benzotriazole, benzimidazole, triazole, benzotriazole, thiazole, benzothiazole, pyrimidine, pyridazine, pyrrolidone and glycoside, and wherein the carbon atoms on the ring of said heterocycle are optionally substituted with one or more $R^5$, $OR^6$, $SR^6$ or $NR^1R^8$, and the N atom or atoms on the ring of said heterocycle are optionally substituted with $R^5$ or $—R^9OR^6$;

each $R^5$ is independently $C_1$-$C_{20}$ alkyl, $C_3$-$C_2$ cycloalkyl or $C_6$-$C_{40}$ aryl;

each $R^6$ is independently H, $C_1$-$C_{20}$ alkyl, $C_3$-$C_{20}$ cycloalkyl or $C_6$-$C_{40}$ aryl; and each $R^7$ and $R^8$ are independently H, $C_1$-$C_{20}$ alkyl, $C_3$-$C_{20}$ cycloalkyl or $C_6$-$C_{40}$ aryl; and each $R^9$ is $C_1$-$C_5$ alkyl.

In another embodiment, $R^2$ of the polyurethane further comprises $Z^4$, and $Z^4$ is a difunctional or trifunctional isocyanate reactant selected from the group consisting of a diol that contains a sulfone and a diamine that contains a sulfone.

The key features of the polyurethane dispersant are the moieties or substituents that are capable of interacting with cellulose. These moieties or substituents are pendent to the polymer backbone and/or terminal to the polymer chain. The term "pendent" means that a substituent is directly attached to the backbone of a polymer or via a linkage of between 1 to 10 atoms.

The $R^2$ group in Formula I is comprised of difunctional isocyanate reactants $Z^1$, $Z^2$ and $Z^3$, wherein there is at least one $Z^1$ and at least one $Z^3$. This $R^2$ group provides the polyurethanes with significant areas of hydrophobic segment which can be effective in dispersing pigments. While not being bound by theory, these areas of hydrophobic segment may be effective as the part of the dispersant that is associated with the pigment surfaces. The polyurethane dispersant must have at least one $Z^1$ and at least one $Z^3$ to satisfy the requirements that the polyurethane contains an aqueous dispersing moiety, and at least one component capable of interacting with cellulose. The blending of $Z^1$, $Z^2$ and $Z^3$ in the polyurethane can be in any sequence. Depending on the sequence of addition during the synthesis of the polyurethane, the $R^2$ component (combination of $Z^1$, $Z^2$ and $Z^3$) can be random or in blocks.

Ionic Difunctional Isocyanate Reactant ($Z^1$)

The difunctional isocyanate reactant $Z^1$ in Formula I contains an aqueous dispersing moiety that is ionic or ionizable. In the context of this disclosure, the term "isocyanate reactant", or "isocyanate reactive", is taken to include groups well known to those of ordinary skill in the relevant art to react with isocyanates, and typically include hydroxyl, primary amino and secondary amino groups. The term "difunctional" means containing two of the isocyanate reactive groups.

Examples of ionic dispersing groups include carboxylate groups ($—COOM$), phosphate groups ($—OPO_3M_2$), phosphonate groups ($—PO_3M_2$), sulfonate groups ($—SO_3M$), and quaternary ammonium groups ($—NR_3Q$), wherein M is a cation such as a monovalent metal ion (e.g., $Na^+$, $K^+$, $Li^+$, etc.), $H^+$ or $NR_4^+$; Q is a monovalent anion such as chloride or hydroxide; and each R can independently be an alkyl, aralkyl, aryl or hydrogen. These ionic dispersing groups are typically located pendent to the polyurethane backbone.

The ionizable groups in general correspond to the ionic groups, except that they are in the acid (such as carboxyl $—COOH$) or base (such as primary, secondary or tertiary amine $—NH_2$, $—NRH$, or $—NR_2$) form. The ionizable groups are such that they are readily converted to their ionic form during the dispersion/polymer preparation process as discussed below.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are preferred. Specific examples of anionic groups include carboxylate and sulfonate groups. Examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups. The acid salts are formed by neutralizing the corresponding acid groups either prior to, during or after formation of the NCO prepolymer.

Suitable compounds for incorporating carboxyl groups are described in U.S. Pat. Nos. 3,479,310, 4,108,814 and 4408008. Examples of carboxylic group-containing compounds are the hydroxy-carboxylic acids corresponding to the formula $(HO)_pQ(COOH)_q$, wherein Q is $C_1$-$C_{10}$ alkyl, p is 1 or 2, and q is 1 to 3. Examples of these hydroxy-carboxylic acids include citric acid, tartaric acid and hydroxypivalic acid. Optional dihydroxy alkanoic acids include the α,α-dimethylol alkanoic acids represented by the structure of Formula II below:

wherein Q' is hydrogen or $C_1$-$C_8$ alkyl. Additional α,α-dimethylol alkanoic acids are represented by the structural formula $R^5C$—$(CH_2OH)_2$—COOH, wherein $R^5$ is hydrogen or $C_1$-$C_8$ alkyl. Examples of these ionizable diols include, but are not limited to, dimethylolacetic acid, 2,2'-dimethylolbutanoic acid, 2,2'-dimethylolpropionic acid (DMPA), and 2,2'-dimethylolbutyric acid. Suitable carboxylates also include $H_2N$—$(CH_2)_4$—$CH(CO_2H)$—$NH_2$, and $H_2N$—$CH_2$—$C_1$—$H_2$—$NH$—$CH_2$—$CH_2$—$CO_2Na$.

Typical sulfonate groups for incorporation into the polyurethanes include diol sulfonates described in U.S. Pat. No. 4,108,814. Suitable diol sulfonate compounds also include hydroxyl terminated copolyethers comprising repeat units derived from the reaction of a diol and a sulfonated dicarboxylic acid. Specifically, the sulfonated dicarboxylic acid is 5-sulfo-isophthalic acid and the diol is 1,3-propanediol. Other suitable sulfonates include the ones represented by formula $H_2$—N—$CH_2$—CH—$CH_2$—NH—$(CH\ 2)_r$—$SO_3Na$, wherein r is 2 or 3.

When the ionic stabilizing groups are acids, the acid groups are incorporated in an amount sufficient to provide an acid group content for the polyurethane, known by those skilled in the art as acid number (mg KOH per gram solid polymer), of at least 6, typically at least 10, and even more typically 20 milligrams KOH per 1.0 gram of polyurethane. The upper limit for the acid number (AN) is about 120, and typically about 100.

Within the context of this disclosure, the term "neutralizing agents" is meant to embrace all types of agents which are useful for converting potentially ionic or ionizable groups to ionic groups. When amines are used as the neutralizing agent, the chain terminating reaction producing the urea termination is typically completed prior to the addition of the neutralizing agent that can also act as an isocyanate reactive group.

In order to convert an anionic group to its salt form before, during or after its incorporation into a prepolymer, either volatile or nonvolatile basic materials may be used to form the counterion of the anionic group. Volatile bases are those wherein at least about 90% of the base used to form the counterion of the anionic group volatilizes under the conditions used to remove water from the aqueous polyurethane dispersions. Nonvolatile bases are those wherein at least about 90% of the base does not volatilize under the conditions used to remove water from the aqueous polyurethane dispersions.

Suitable volatile basic organic compounds for neutralizing the potential anionic groups are the primary, secondary or tertiary amines. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone.

Suitable nonvolatile bases include alkoxides, hydroxides, carbonates or bicarbonates of monovalent metals, especially the alkali metals, lithium, sodium and potassium.

When the anionic groups on the polyurethane are neutralized, they provide hydrophilicity to the polymer and better enable it to stably disperse pigment in water. However, it may be desirable to control the degree of neutralization. When the anionic groups on the polyurethane are partially neutralized, the polyurethane becomes more hydrophobic and therefore adsorbs onto the pigment surface. Reducing the amount of the un-adsorbed polymer from the pigment dispersion provides an advantageous condition for the cross-linkable moieties on the polyurethane, adsorbing onto the pigment surface, to react with a cross-linking agent without the competition from cross-linkable moieties on the un-adsorbed polyurethane. Typically the degree of neutralization is from 40% to 100%, and more typically from 50% to 70%, depending on the acid number of the polyurethane.

Difunctional Isocyanate Reactant ($Z^2$)

Suitable $Z^2$ diols contain at least two hydroxyl groups, and have a molecular weight of from about 60 to about 6000. Of these, the polymeric first diols are best defined by the number average molecular weight, and can range from about 200 to about 6000, specifically, from about 400 to about 3000, and more specifically from about 600 to about 2500. The molecular weights can be determined by hydroxyl group analysis (OH number).

$Z^2$ diol includes those that are derived from monomeric l,n-diols where in is at least 3 and can be up to about 36.

$Z^2$ can be from polyester diols, polyether diols, polycarbonate diols, polyester carbonate diols and polyacrylate diols. Other isocyanate reactive components are chosen for their stability to hydrolysis, adhesion, toughness, and balance of hydrophilicity and hydrophobicity.

Examples of polymeric polyols include polyesters, polyethers, polycarbonates, polyacetals, poly(meth)acrylates, polyester amides, and polythioethers. A combination of these polymers can also be used. For examples, a polyether polyol and a poly(meth)acrylate polyol may be used in the same polyurethane synthesis.

Examples of polymeric polyols include polyesters, polyethers, polycarbonates, polyacetals, poly(meth)acrylates, polyester amides, and polythioethers. A combination of these polymers can also be used. For examples, a polyether polyol and a poly(meth)acrylate polyol may be used in the same polyurethane synthesis. In the case of using a polyether polyol, both ionic and nonionic stabilization (from the polyether polyol) can contribute to the stabilization of the polyurethane pigment dispersion.

When the $Z^2$ diol is a polyether diol, the polyether diol may be derived from ethylene oxide, propylene oxide and higher oxetanes. The polyether diol has the formula. HO[—(CHR)$_a$—O—]$_b$H where R is hydrogen or alkyl with 1 to 12 carbons; a and b are integers; a is greater than or equal to 2 to 18; and b is greater than or equal to 2 to about 150. Suitable polyether diols have b equal to 3 or 4. Commercially available compounds for when a=3 and b is greater than 3 include Ceranol™ polyether polyols from DuPont, Wilmington Del. Commercially available compounds for when a is 4 and b is greater than 3 include TERATHANE polytetramethylene ether glycols (PTMEG) available from Invista, Wichita, Kans.

$Z^2$ components may comprise polymeric polyols along with up to 30 mol %, of the total isocyanate reactive components, trisubstituted asymmetric branching compound where the trisubstituted asymmetric branching compound has three isocyanate-reactive substituents where the first isocyanate-reactive substituent is a primary or a secondary amine, and the second and third isocyanate-reactive substituents are the same or different and are selected from the group consisting of a primary or secondary amine, —OH, —PH and —SH and where at least one of the second and third-isocyanate reactive substituents are —OH or —SH.

In general, a trisubstituted asymmetric branching compound is an aliphatic compound with the three isocyanate-reactive substituents. Non-limiting examples of the trisubstituted asymmetric branching compound include diethanolamine, bis-(hydroxylmethyl)-methylamine, dipropanolamine, 1,5-diamino-3-(2-hydroxy ethyl)pentane, and 2-aminoethane-(2 hydroxy ethyl)amine.

Cellulose Interacting Isocyanate Reactant ($Z^3$ and $Z^4$)

Cellulose interacting, isocyanate reactants may be based on diols or diamines containing a pendant heterocycle functionality ($Z^3$) or diols/diamines containing phenyl sulfone functionalities ($Z^4$).

Heterocycle Containing Isocyanate Reactant ($Z^3$)

$Z^3$ are structural similar except $Z^2$ will contain a pendant cellulose interactive substituent in the form of the heterocycle, selected from the group consisting of imidazole, imidazolidinone, oxazolidinone, thiazolidinone, benzotriazole, benzimidazole, triazole, benzotriazole, thiazole, benzothiazole, pyrimidine, pyridazine and glycoside, and pyrrolidone. The heterocycle can be separated from the chain of the difunctional isocyanate reactive group by a linking group with 0-10 carbon atoms.

Diols with pendant cellulose interacting heterocycles may be synthesized in-situ. As previously disclosed in WO2012007254 and U.S. Pat. No. 6,627,761, glycerin carbonate terminated isocynates reacts with primary diamines to form beta-hydroxy polyurethanes, and in addition, glycerin carbonate reacts with a monoamine to form a diol with a urethane pendant group from the monoamine (J. Coating Tech Res, 7(4) 409-419, 2010). Thus, diol with pendant heterocycle may be synthesized in-situ using a regent such as glycerine carbonate where in the latent diol (glycerin carbonate) is reacted with a primary amine compound containing the cellulose interacting heterocycle. Examples of these primary amine compounds with cellulose interacting heterocycles include N-(2-Aminoethyl)-2-pyrrolidone, 1-(2-aminoethyl)-3-methyl-2-Imidazolidinone, 1-(2-Aminoethyl)benzotriazole, N-(3-aminopropyl)-2-pyrrolidone, 1-(3-aminopropyl)-3-methyl-2-Imidazolidinone, and 1-(3-aminopropyl) imidazole. The heterocycle containing monoamine is reacted with gycerine carbonate to form a diol with pendant alkyl phenyl sulfone which is in a continuous process reacted with a diisocyanate forming a polyurethane with pendant cellulose interacting heterocycle functionality.

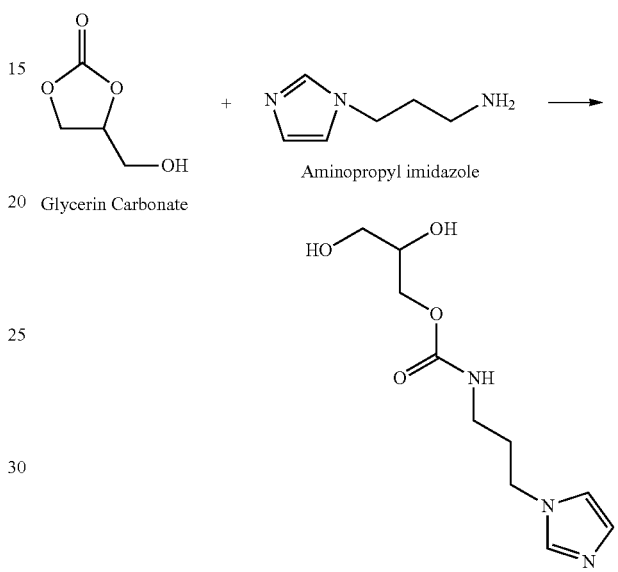

Glycerin Carbonate    Aminopropyl imidazole

Sulfone containing Isocyanate Reactant ($Z^4$)

$Z^4$ reactant is a difunctional or trifunctional. isocyanate reactant selected from the group consisting of a diol which contains a sulfone and a diamine that contains a sulfone. Examples of the sulfone include both aromatic and aliphatic compounds such as bis(2-hydroxyethyl)sulfone, bis(hydroxyethoxy)phenyl sulfone and 4,4'-diaminophenyl sulfone.

Pendant sulfone containing diols may also be derived in-situ from glycerin carbonate reaction with mono-amines containing sulfone functionality. For examples, 3-(phenylsulfonyl)-1-propanamine is reacted with gycerine carbonate to form a diol with pendant alkyl phenyl sulfone which can immediately be reacted with a diisocyanate forming a polyurethane with pendant sulfone functionality.

Capping of the Polyurethane

The capping agent for terminating the polyurethane chain is usually a primary or secondary amine, an alcohol, or a mecapto. The heterocycle compound may be a substituent on the capping agent. This capping agent terminates the polyurethane and does not chain extend the polyurethane. The amount of capping agent employed should be approximately equivalent to the free isocyanate groups in the prepolymer. The ratio of active hydrogens from amine in the capping agent to isocyanate groups in the prepolymer is in the range of from about 1.0:1.0 to about 3.0:1.0, more typically from about 1.0:1.0 to about 1.5:1.0, and still more typically from about 1.0:1.0 to about 1.05:1, on an equivalent basis. Although any isocyanate groups that are not terminated with an amine can react with other isocyanate reactive functional group or water, the ratios of capping agent to isocyanate group is chosen to ensure a urea termination. Amine termination of the polyurethane is avoided by the choice and amount of capping agent leading to a urea terminated polyurethane. This results in better molecular weight control and better properties when used as a particle dispersant, and ease in handling when added to formulations.

Any primary or secondary amines substituted with reactive isocyanate groups may be used as chain terminators. Especially useful are aliphatic primary or secondary monoamines, or diamines. Less reactive isocyanate groups such as hydroxyl, carboxyl, and mercapto could also be used. Example of amines useful as chain terminators include, but are not restricted to, diethanolamine, monoethanolamine, 3-amino-1-propanol, isopropanolamine, N-ethylethanolamine, diisopropanolamine, 6-aminocaproic acid, 8-aminocaprylic acid, and 3-aminoadipic acid. Examples of chain terminator with cellulose interacting heterocycles include N-(2-Aminoethyl)-2-pyrrolidone, 1-(2-aminoethyl)-3-methyl-2-Imidazolidinone, 1-(2-Aminoethyl)benzotriazole, N-(3-aminopropyl)-2-pyrrolidone, 1-(3-aminopropyl)-3-methyl-2-Imidazolidinone, and 1-(3-aminopropyl)imidazole.

Polyisocyanate Component

Suitable polyisocyanates are those that contain either aromatic, cycloaliphatic or aliphatic groups bound to the isocyanate groups. Mixtures of these compounds may also be used. If aromatic isocyanates are used, cycloaliphatic or aliphatic isocyanates can be present as well.

Any diisocyanate useful in preparing polyurethanes via its reaction with polyether glycols, diols or amines can be used in this invention.

Examples of suitable diisocyanates include, but are not limited to, 2,4-toluene diisocyanate (TDI), 2,6-toluene diisocyanate, trimethyl hexamethylene diisocyanate (TMDI), 4,4'-diphenylmethane diisocyanate (MDI), 4,4'-dicyclohexylmethane diisocyanate ($H_{12}$MDI), 3,3'-dimethyl-4,4'-biphenyl diisocyanate (TODI), dodecane diisocyanate ($C_{12}$DI), m-tetramethylene xylylene diisocyanate (TMXDI), 1,4-benzene diisocyanate, trans-cyclohexane-1,4-diisocyanate, 1,5-naphthalene diisocyanate (NDI), 1,6-hexamethylene diisocyanate (HDI), 4,6-xylyene diisocyanate, isophorone diisocyanate (IPDI), and combinations thereof.

Small amounts, typically less than about 3% by weight based on the weight of the diisocyanate, of monoisocyanates or polyisocyanates can be used in a mixture with the diisocyanate. Examples of useful monoisocyanates include alkyl isocyanates such as octadecyl isocyanate and aryl isocyanates such as phenyl isocyanate. Examples of useful polyisocyanates are triisocyanatotoluene HDI trimer and polymeric MDI.

Colorants

Suitable colorants for the inks include soluble colorants such as dyes and insoluble colorants such as dispersed pigments (pigment plus dispersing agent) and self-dispersed pigments.

Conventional dyes such as anionic, cationic, amphoteric and non-ionic dyes are suitable. Such dyes are well known to those of ordinary skill in the art. Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

The types of anionic dyes most suitable are, for example, Acid, Direct, Food, Mordant and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most suitable include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

Useful dyes include (cyan) Acid Blue 9 and Direct Blue 199; (magenta) Acid Red 52, Reactive Red 180, Acid Red 37, CI Reactive Red 23; and (yellow) Direct Yellow 86, Direct Yellow 132 and Acid Yellow 23.

Pigments suitable for use are those generally well-known in the art for aqueous inkjet inks. Traditionally, pigments are stabilized by dispersing agents, such as polymeric dispersants or surfactants, to produce a stable dispersion of the pigment in the vehicle. Representative commercial dry pigments are listed in U.S. Pat. No. 5,085,698. Dispersed dyes are also considered pigments as they are insoluble in the aqueous inks used herein.

A wide variety of organic and inorganic pigments, alone or in combination, may be selected to make the ink. The term "pigment" as used herein means an insoluble colorant which includes dispersed dyes as they are insoluble in the inkjet ink. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron, and in embodiments, the pigment particle size ranges from about 0.005 to about 5 micron, and in embodiments, from about 0.005 to about 1 micron. The average particle size as measured by dynamic light scattering is preferably less than about 500 nm, more preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form.

The dispersed pigment may be purified after the dispersion process by filtration, ultrafiltration or other processes used for purification of dispersed pigments.

The polymerically dispersed pigments may have the polymeric dispersants crosslinked after the dispersion process is completed. In this case the pigment is thought to have its polymeric dispersants crosslinked to each other by the addition of crosslinked components. A type of this crosslinking is described in U.S. Pat. No. 6,262,152.

The pigment of the present disclosure can also be a self-dispersing (or self-dispersible) pigment. The term self-dispersing pigment (or "SDP") refers to pigment particles whose surface has been chemically modified with hydrophilic, dispersability-imparting groups that allow the pigment to be stably dispersed in an aqueous vehicle without a separate dispersant. "Stably dispersed" means that the pigment is finely divided, uniformly distributed and resistant to particle growth and flocculation.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. No. 5,554,739 and U.S. Pat. No. 6,852,156.

The SDPs may be black, such as those based on carbon black, or may be colored pigments. Examples of pigments with coloristic properties useful in inkjet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "C.I.".

The SDPs of the present disclosure may have a degree of functionalization wherein the density of anionic groups is less than about 3.5 µmoles per square meter of pigment surface (3.5 $\mu mol/m^2$), and more specifically, less than about 3.0 $\mu mol/m^2$. Degrees of functionalization of less than about 1.8 $\mu mol/m^2$, and more specifically, less than about 1.5 $\mu mol/m^2$, are also suitable and may be preferred for certain specific types of SDPs.

The range of useful particle size after dispersion is typically from about 0.005 micrometers to about 15 micrometers. Typically, the pigment particle size should range from about 0.005 micrometers to about 5 micrometers; and, specifically, from about 0.005 micrometers to about 1 micrometers. The average particle size as measured by dynamic light scattering is less than about 500 nm, typically less than about 300 nm.

The amount of pigment present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

Polymeric Dispersant

The polymeric dispersant for the non-self-dispersing pigment(s) may be a random or a structured polymer. Typically, the polymer dispersant is a copolymer of hydrophobic and hydrophilic monomers. The "random polymer" means polymers where molecules of each monomer are randomly arranged in the polymer backbone. For a reference on suitable random polymeric dispersants, see: U.S. Pat. No. 4,597,794.

The "structured polymer" means polymers having a block, branched, graft or star structure. Examples of structured polymers include AB or BAB block copolymers such as the ones disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306,994 and U.S. Pat. No. 6,433,117.

Dispersion of the Pigment Particles

The dispersing step for the polymerically dispersed pigment may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill is chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. No. 5,022,592, U.S. Pat. No. 5,026,427, U.S. Pat. No. 5,891,231, U.S. Pat. No. 5,679,138, U.S. Pat. No. 5,976,232 and US Patent Application Publication No. 20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for ink-jet inks the target value of the D50 is 125 nm or less, preferably less than 100 nm. Also the D95 and the particles smaller than 204 nm can be used as a test criterion for the pigment dispersions.

A wide variety of organic and inorganic pigments, alone or in combination, may be selected for dispersion by this process. The dispersed pigment may be used in paints, inks and especially inkjet inks. The term "pigment" as used herein means an insoluble colorant and in the present application includes disperse dyes. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss.

The dispersed pigment may be purified after the dispersion process by filtration, ultrafiltration or other processes used for purification of dispersed pigments.

Crosslinked Polymeric Dispersant

The polymeric dispersant may be crosslinked after the pigment dispersion is prepared.

Polymeric dispersants substituted with crosslinkable moieties including acetoacetoxy, acid, amine, epoxy, hydroxyl, blocked isocyanates and mixtures thereof are capable of undergoing crosslinking. Typically, a crosslinking agent is added to effect crosslinking. Typical crosslinking agents include acetoacetoxy, acid, amine, anhydride, epoxy, hydroxyl, isocyanates, blocked isocyanates and mixtures thereof. The crosslinking of the polymeric dispersant is typically conducted after the pigment is dispersed. After the crosslinking step excess polymeric dispersant can be removed by purification processes such as ultrafiltration.

Specific examples of crosslinking moiety/agent pairs are hydroxyl/isocyanate and acid/epoxy.

The product of this crosslinking process is a stable, dispersed pigment. This stable pigment dispersion is one that has less than 10% particle size growth and no flocculation when the dispersion is stored at room temperature for at least a week. More rigorous testing that entails accelerated testing by heating samples for a week or more can also be used to determine the stability of the particle dispersions. The optimal particle dispersion stability would depend on the dispersion's characteristics and/or final use. Another criterion for a stable dispersed particle is that it can be processed under normal dispersing process conditions, without turning into a gel or having other adverse properties.

Amounts/Ratios of the Ingredients

For the inkjet inks the amount of the polymeric ink additive can vary from 0.05 to 12% by weight based on the weight of the total ink composition. Alternatively the amount can be 0.2 to 7% by weight.

For inkjet inks the mass ratio of pigment to polymeric dispersant ranges from 0.33 to 400. This ratio is based on the mass of the pigment and that of the polymeric dispersant added to the dispersion. For organic pigments the ratio is 0.33 to 12, optionally 0.5 to 10. For inorganic pigments the ratio is 3 to 400, optionally 5 to 200.

In the case of organic pigments, the inkjet ink may contain up to approximately 30% of the pigment, optionally 0.11 to 25%, and further from 0.25 to 15% pigment by weight based on the total ink weight of the ink. If an inorganic pigment is selected, the ink will tend to contain higher weight percentages of pigment than with comparable inks employing organic pigment, and the ink may be as high as 75% in some cases, since inorganic pigments generally have higher specific gravities than organic pigments. Examples of inorganic pigments include titanium dioxide, iron oxides, and the like.

Aqueous Carrier Medium

The aqueous carrier medium (aqueous vehicle) for the inkjet inks which utilize the encapsulated pigment described above is water or a mixture of water and at least one water-miscible organic solvent. Selection of a suitable mixture depends on requirements of the specific application, such as desired surface tension and viscosity, the selected pigment, drying time of the pigmented inkjet ink, and the type of paper onto which the ink will be printed. Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl)ether, diethylene glycol mono-methyl (or -ethyl)ether, propylene glycol mono-methyl (or -ethyl)ether, triethylene glycol mono-methyl (or -ethyl)ether and diethylene glycol di-methyl (or -ethyl)ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of water and a polyhydric alcohol, such as diethylene glycol, is preferred as the aqueous carrier medium. In the case of a mixture of water and diethylene glycol, the aqueous carrier medium usually contains from 30% water/70% diethylene glycol to 95% water/5% diethylene glycol. The preferred ratios are approximately 60% water/40% diethylene glycol to 95% water/5% diethylene glycol. Percentages are based on the total weight of the aqueous carrier medium. A mixture of water and butyl carbitol is also an effective aqueous carrier medium.

The amount of aqueous carrier medium in the ink is typically in the range of 70% to 99.8%, and preferably 80% to 99.8%, based on total weight of the ink.

The aqueous carrier medium can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from 1 to 15% by weight and more typically 2 to 10% by weight, based on the total weight of the ink. Surfactants may be used, typically in the amount of 0.01 to 5% and preferably 0.2 to 4%, based on the total weight of the ink.

Other Additives

Other ingredients, additives, may be formulated into the inkjet ink, to the extent that such other ingredients do not interfere with the stability and jettability of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Ink Sets

The term "ink set" refers to all the individual inks or other fluids an inkjet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. Such other inks are, in a general sense, known to one skilled in the art.

A typical ink set comprises a magenta, yellow, cyan and black ink, wherein the black ink is an ink according to the present disclosure comprising an aqueous vehicle and a self-dispersing carbon black pigment. Specifically, the colorant in each of the magenta, yellow and cyan inks is a dye.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity of the inventive inks at 25° C. can be less than about 7 cP, typically less than about 5 cP, and more typically than about 3.5 cP. Thermal inkjet actuators rely on instantaneous heating/bubble formation to eject ink drops and this mechanism of drop formation generally requires inks of lower viscosity.

Substrate

The present embodiments are particularly advantageous for printing on plain paper, such as common electrophotographic copier paper and photo paper, glossy paper and similar papers used in inkjet printers.

EXAMPLES

The following examples illustrate various embodiments of the present disclosure without, however, being limited thereto. Tests listed here are those that are commonly used for testing pigment dispersions and inkjet inks.

The particle size for the pigment dispersions and the inks were determined by dynamic light scattering using a MICROTRAC UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution. Results are reported as D50 and D95 and particles less than 204 nm.

MW Characterization of the Polymeric Ink Additives

Gel Permeation Chromatography or GPC was used to verify predicted molecular weight and molecular weight distribution. The GPC system included a Waters 1515 Isocratic HPLC Pump, Waters 2414 Refractive Index Detector, 717 plus Waters Autosampler, Four Styregel Columns (HR 0.5, HR 1, HR 2, and HR 4) in series in a Waters Column Heater set to 40° C. Samples were eluted with Tetrahydrofuran (THF) at a flow rate of 1 mL/min. The samples were analyzed using Breeze 3.30 Software with a calibration curve developed from narrow molecular weight, polymethylmethacrylate (PMMA) standards. Based on light scattering data from Polymer Laboratories Ltd., the nominal, peak molecular weight for the PMMA standards were as follows: 300000, 150000, 60000, 30000, 13000, 6000, 2000, and 1000.

The inks were tested by printing on various substrates with Epson and HP printers. Plain paper, glossy paper and brochure paper were tested.

The optical density was measured using a Greytag-Macbeth SpectroEye™ instrument (Greytag-Macbeth AG, Regensdorf, Switzerland).

The durability of the image towards highlighter smear was done using a Faber-Castel highlighter pen after the printed image was allowed to dry for one hour after printing. The image was marked twice, the first mark was with a single pass with the highlighter and the second mark was with two passes with the highlighter. These highlighter marks were tested by measuring the optical density in the region on the smear adjacent to the printed image. The optical density is corrected for a highlighter that is not drawn across the printed image. That is, after the highlighter is drawn across the printed marks the OD is measured in the yellow highlighted area adjacent to the printed marks. In this area will be the highlighter and the transferred pigment. The amount of optical density measured is an indication of how much of the printed image is smeared and a higher number demonstrates a worse result. This smear is reported in milliOD units.

Polyurethane Ink Additive 1 (Binder 1): 14IPDI/HQEE 80 AN APIZ

Loaded 2 L reactor with 105.1 g Poly-G HQEE (OH #555, Arch Chemical), 317.9 g Sulfolane (5% Proglyde DMM), 0.22 g dibutyl tin dilaurate, and 96.3 g dimethylol propionic acid. The reaction was heated to 71° C. Over 25 minutes 298.7 g isophorone diisocyanate was added followed by 25.56 g Sulfolane (5% Proglyde DMM). The reaction was held at 84-89° C. for 10 hrs when the % NCO was 0.94%. Then, 200 g Sulfolane (5% Proglyde DMM) and 24.0 g aminopropyl imidazole was added over 10 minutes. The reaction was held at 80° C. for 1 hr when the % NCO was 0%. The polyurethane solution was inverted under high speed mixing by adding a mixture of 45% KOH (89.5 g) and 313.2 g water followed by an additional 731.5 g water and 2.0 g Proxel GXL. The polyurethane dispersion had a viscosity of 253.1 cPs, 27.44% solids, pH12.04, and molecular weight by GPC of Mn 6151 and PD 2.07.

Polyurethane Ink Additive 2 (Binder 2):14IPDI/HEPS 80 AN APIZ

Loaded 2 L reactor with 136.3 g bis(hydroxyethoxy)phenyl sulfone (HEPS), 316.4 g Sulfolane (5% Proglyde DMM), 0.19 g dibutyl tin dilaurate, and 96.0 g dimethylol propionic acid. The reaction was heated to 73° C. Over 25 minutes 267.8 g isophorone diisocyanate was added followed by 27 g Sulfolane (5% Proglyde DMM). The reaction was held at 81° C. for 1.5 hrs when the % NCO was 1.16%. Then, 200 g Sulfolane (5% Proglyde DMM) and 21.5 g aminopropyl imidazole was added over 10 minutes. The reaction was held at 80-90° C. for 3 hr when the % NCO was 0%. The polyurethane solution was inverted under high speed mixing by adding a mixture of 45% KOH (89.3 g) and 312.4 g water followed by an additional 739 g water and 2.0 g Proxel GXL. The polyurethane dispersion had a viscosity of 809.8 cPs, 31.81% solids, pH 11.92, and molecular weight by GPC of Mn 6416 and PD 1.89.

Polyurethane Ink Additive 3 (Binder 3): 14IPDI/T650 80 AN APIZ

Loaded 2 L reactor with 165.9 g polyTHF6500 (BASF), 449.7 g Sulfolane (5% Proglyde DMM), 0.39 g dibutyl tin dilaurate, and 96.2 g dimethylol propionic acid. The reaction was heated to 72° C. Over 25 minutes 238.4 g isophorone diisocyanate was added followed by 30 g Sulfolane (5% Proglyde DMM). The reaction was held at 80° C. for 2.5 hrs when the % NCO was 0.88%. Then, 24.4 g aminopropyl imidazole was added over 10 minutes. The reaction was held at 80° C. for 1 hr when the % NCO was 0.3%. After another 1 hr at 80° C., the polyurethane solution was inverted under high speed mixing by adding a mixture of 45% KOH (80.4 g) and 281.5 g water followed by an additional 635.6 g water and 2.0 g Proxel GXL. The polyurethane dispersion had a viscosity of 130.2 cPs, 27.43% solids, pH 8.81, and molecular weight by GPC of Mn and PD.

Polyurethane Ink Additive 4 (Binder 4): 14IPDI/T650 10% DEA 45 AN APIZ

Loaded 2 L reactor with 137.3 g polyTHF650 (BASF), 92.28 g Tetraethylene glycol dimethyl ether, 2.60 g diethanol amine, 0.08 g dibutyl tin dilaurate, and 92.94 g dimethylol propionic acid. The reaction was heated to 78° C. Over 45 minutes 117.0 g isophorone diisocyanate was added followed by 9.58 g Tetraethylene glycol dimethyl ether. The reaction was held at 85° C. for 5 hrs when the % NCO was 0.98%. Then, 13.06.4 g aminopropyl imidazole was added over 10 minutes. The reaction was held at 80° C. for 3 hr. The polyurethane solution was inverted under high speed mixing by adding a mixture of 45% KOH (27.2 g) and 281.6 g water followed by an additional 503.2 g water and 2.0 g Proxel GXL. The polyurethane dispersion had a viscosity of 26.2 cPs, 25.93% solids, pH 10.41, surface tension of 43.16 dynes/cm, and molecular weight by GPC of Mn 8241 and PD 2.92.

Polyurethane Ink Additive 5 (Binder 5); 14IPDI/T1000 60AN APIZ

Loaded 2 L reactor with 210.87 g Terathane 1000 (Invista), 289.33 g Sulfolane (5% Proglyde DMM), 0.3 g dibutyl tin dilaurate, and 70.76 g dimethylol propionic acid. The reaction was heated to 76° C. Over 60 minutes 178.2 g isophorone diisocyanate was added followed by 29.3 g Sulfolane (5% Proglyde DMM). The reaction was held at 85° C. for 4.5 hrs when the % NCO was less than 1.3%. Then, 14.33 g aminopropyl imidazole was added over 10 minutes. The reaction was held at 85° C. for 2 hr. The polyurethane solution was inverted under high speed mixing by adding a mixture of 45% KO (58.9 g) and 824.5 g water followed by an additional 324.2 g water and 2.0 g Proxel GXL. The polyurethane dispersion had a viscosity of 7.1 cPs, 22.05% solids, pH 10.46, surface tension of 42.3 dynes/cm, and molecular weight by GPC of Mn 5355 and PD 2.33. The pre-inversion polyurethane had an acid number of 67.89 mg KOH/g solids.

Polyurethane Ink Additive 6 (Binder 6): 14TDI/T650 D400 61AN APIZ

Loaded 2 L reactor with 126.35 g polyTHF650 (BASF), 633.45 g Tetraethylene glycol dimethyl ether, 82.49 g Jeffamine D400 (polypropylene glycol diamine, 416.7 molecular weight), and 72.66 g dimethylol propionic acid. The reaction was heated to 67° C. Over 60 minutes 174.86 g toluene diisocyanate was added followed by 28.3 g Tetraethylene glycol dimethyl ether. The reaction was held at 85° C. for 3.5 hrs when the % NCO was less than 1.3%. Then, 18.01 g aminopropyl imidazole was added over 10 minutes. The reaction was held at 85° C. for 1 hr. The polyurethane solution was inverted under high speed mixing by adding a mixture of 45% KOH (60.2 g) and 842.2 g water. The polyurethane dispersion had a viscosity of 412.9 cPs, 22.16% solids, pH 9.07, and surface tension of 40.64 dynes/cm.

Polyurethane Ink Additive 7 (Binder 7): IPDI/T650 25% DEA 60 AN APIZ

Loaded 2 L reactor with 163.39 g polyTHF650 (BASF), 211.15 g Tetraethylene glycol dimethyl ether, 8.98 g diethanol amine, and 71.79 g dimethylol propionic acid. The reaction was heated to 69° C. Over 30 minutes 232.64 g isophorone diisocyanate was added followed by 29.05 g Tetraethylene glycol dimethyl ether. The reaction was held at 87-89° C. for 4 hrs when the % NCO was 2.13%. Then, 47.0 g aminopropyl imidazole was added over 10 minutes followed by 179.8 g Tetraethylene glycol dimethyl ether. The reaction was held at 80° C. for 2.5 hr. The polyurethane solution was inverted under high speed mixing by adding a mixture of 45% KOH (57.4 g) and 608.5 g water followed by an additional 573.2 g water and 2.0 g Proxel GXL. The polyurethane dispersion had a viscosity of 46.9 cPs, 24.98% solids, pH 13.03, surface tension of 41.93 dynes/cm, and molecular weight by GPC of Mn 7220 and PD 3.43. The pre-inversion polyurethane had an acid number of 60.03 mg KOH/g solids.

Polyurethane Ink Additive 8 (Binder 8): 14TDI/T650 D230 61AN APIZ

Loaded 2 L reactor with 137.0 g polyTHF650 (BASF, MW 640.4 based on OH titration on COA), 51 7.26 g Sulfolane (5% Proglyde DMM), 48.15 g Jeffamine D230 (polypropylene glycol diamine, 224.7 molecular weight based on amine titration on COA), and 77.98 g dimethylol propionic acid. The reaction was heated to 72° C. Over 60 minutes, 189.95 g toluene diisocyanate was added followed by 81.02 g Sulfolane (5% Proglyde DMM). The reaction was held at 75-80° C. for 4.5 hrs, at which time the % NCO was less than 1.1%. Then, 20.44 g aminopropyl imidazole was added over 10 minutes followed by 102.76 g Sulfolane (5% Proglyde DMM). The reaction was held at 80-85° C. for 1.5 hr. The polyurethane solution was inverted under high speed mixing by adding a mixture of 45% KOH (65.1 g) and 916.2 g water. The poly urethane dispersion had a viscosity of 49 cPs, 22.48% solids, pH 9.11, surface tension of 43.31 dynes/cm, and molecular weight by GPC of Mn 6987 and PD 2.39.

Polyurethane Ink Additive 9 (Binder 9): 14TMXDI/DDS T650 70AN APIZ

Loaded 2 L reactor with 78.88 g 4-aminophenyl sulfone (DDS, MW 248.3, Huntsman HT 976), 50.81 g polyTHF650 (BASF, MW 640.4 based on OH titration on COA), 331 g tetraglyme, and 83.34 g dimethylol propionic acid. The reaction was heated to 60° C. Over 30 minutes, 189.95 g tetramethylene xylene diisocyanate was added followed by 44.9 g tetraglyme. The reaction was held at 85° C. for 6 hrs, at which time the % NCO was less than 1.1%. Then, 20.09 g aminopropyl imidazole was added over 10 minutes. The reaction was held at 80-85° C. for 1 hr. The polyurethane solution was inverted under high speed mixing by adding a mixture of 45% KOH (70.0 g) and 1121.42 g water. The polyurethane dispersion had a viscosity of 111 cPs, 30.46% solids, pH 9.33, surface tension of 42.49 dynes/cm, and molecular weight by GPC of Mn 4414 and PD 1.70.

Polyurethane Ink Additive 10 (Binder 10): 14TMXDI/DDS D230 70AN APIZ

Loaded 2 L reactor with 58.18 g 4-aminophenyl sulfone (DDS, MW 248.3. Huntsman HT 976), 52.76 g Jeffamine D230 (polypropylene glycol diamine, 224.7 molecular weight based on amine titration on COA), 334.35 g tetraglyme, and 84.10 g dimethylol propionic acid. The reaction was heated to 71.7° C. Over 30 minutes, 286.00 g tetramethylene xylene diisocyanate was added followed by 46.91 g tetraglyme. The reaction was held at 85° C. for 5 hrs when the % NCO was less than 1.0%. Then, 20.89 g aminopropyl imidazole was added over 10 minutes. The reaction was held at 80-85° C. for 2 hr. The polyurethane solution was inverted under high speed mixing by adding a mixture of 45% KOH (69.94 g) and 917.23 g water followed by an additional 132.22 g water. The polyurethane dispersion had a viscosity of 62 cPs, 29.99% solids, pH 10.98, surface tension of 44.76 dynes/cm, and molecular weight by GPC of Mn and PD Polyurethane Ink Additive 11 (Binder 11): 14TMXDI/HEPS 56 AN APIZ Loaded 2 L reactor with 169.41 g bis(hydroxyethoxy)phenyl sulfone (HEPS), 22.5 g Sulfolane (5% Proglyde DMM), 0.19 g dibutyl tin dilaurate, and 67.3 g dimethylol propionic acid. The reaction was heated to 68° C. Over 25 minutes 263.4 g tetramethylene xylene diisocyanate was added followed by 22 g Sulfolane (5% Proglyde DMM). The reaction was held at 83° C. for 2 hrs when the % NCO was 1.3%. Then, 19.3 g aminopropyl imidazole was added over 10 minutes followed by 120 g Sulfolane (5% Proglyde DMM). The reaction was held at 83° C. for 1 hr when the % NCO reading was 1.5% below 0%. The polyurethane solution was inverted under high speed mixing by adding a mixture of 45% KOH (62.444 g) and 230 g water followed by an additional 826.5 g water and 2.0 g Proxel GXL. The polyurethane dispersion had a viscosity of 2509 cPs, 27.79% solids, pH 9.15, surface tension of 26.56 dynes/cm, and molecular weight by GPC of Mn 3862 and PD 1.74.

Polyurethane Ink Additive 12 (Binder 11): 14TMXDI/HEPS 56 AN APIZ

Diol from Glycerin Carbonate and Aminopropyl imidazole (GC-APIZ diol) Loaded a 1 L reactor with 141.77 g Sulfolane and 198.0 g aminopropyl imidazole. The mixture was heated to 49.5° C., and the 186.6 g glycerin carbonate (Jeffasol GC from Huntsman) was added over minutes. The reaction mixture was heated at 75-80 C for 10 hr at which time FTIR analysis verified disappearance of carbonate and formation of dominate carbamate peak from 2,3-dihydroxypropyl [3-(1H-imidazol-1-yl)propyl]carbamate).

Loaded 2 L reactor with 64.25 g polyTHF650 (BASF), 516.45 g Sulfolane, 139.12 g GC-APIZ diol (above prep at 70.65%), and 71.9 g dimethylol proprionic acid. The reaction was heated to 60.6° C. Over 30 minutes 248.25 g isophorone diisocyanate during which the reaction exothermed to 89° C. was added followed by 41.83 g Sulfolane. The reaction was held at 80° C. for 2.5 hrs when the uncorrected % NCO reading was −0.37%. Then, 20.15 g aminopropyl imidazole was added over 10 minutes. After another 2 hr at 85° C., the polyurethane solution was inverted under high speed mixing by adding a mixture of 45% KOH (59.7 g) and 452.68 g water followed by an additional 390.56 g water and 2.44 g proxel GXL. The polyurethane dispersion had a viscosity of 130.2 cPs, 27.43% solids, and pH 8.81.

Polyurethane Ink Additive 13 (Binder 13): IPDI/HEPS T650 APIZ 68AN

Loaded 2 L reactor with 91.0 g bis(hydroxyethoxy)phenyl sulfone (HEPS), 387.7 g Sulfolane (5% Proglyde DMM), 72.9 g polyTHF650 (BASF), and 90.7 g dimethylol proprionic acid. The reaction was heated to 67° C. Over 30 minutes 235.7 g isophorone diisocyanate was added followed by 39.2 g Sulfolane (5% Proglyde DMM). The reaction was held at 80-90° C. for 2.5 hrs when the % NCO was 1.17%. Then, 19.1 g aminopropyl imidazole was added over 10 minutes. The reaction was held at 85° C. for 1 hr. The polyurethane solution was inverted under high speed mixing by adding a mixture of 45% KOH (67.5 g) and 945.8 g water followed by an additional 69.8 g water and 2.0 g proxel GXL. The polyurethane dispersion had a viscosity of 506.9 cPs, 26.87% solids, pH 8.88, surface tension of 43.9 dynes/cm and molecular weight by GPC of Mn 6328 and PD 2.3.

Dispersant Polymer 1 (Polyurethane 1): DEA terminated TMXDI/UH-50/DMPA

To a dry, alkali- and acid-free, 2 liter flask equipped with an additional funnel, a condenser and a stirrer, under a nitrogen atmosphere was added Eternacoll® UH-50 (117.0 g), dimethylol propionic acid (87.0 g) and Sulfolane (220.0 g). The contents were heated to 115° C. and mixed under a nitrogen gas purge for 30 minutes. The temperature was then lowered to 60° C. and DBTDL (0.08 g) was added followed by TMLXDI (238.0 g) via the addition funnel. The residual TMXDI in the additional funnel was rinsed into the flask with Sulfolane (15.0 g). The stirred reaction mass was allowed to exotherm. When exotherm began to slow, the temperature was maintained at 100° C. while monitoring the isocyanate content until it reached 1.06%. The temperature was lowered to 60° C. To the flask was added DEA (18.04 g) via the additional funnel followed by rinsing the residual DEA in additional funnel into the flask with Sulfolane (5.0 g). The mixture was maintained at 60° C. for 90 minutes. A solution of 45% KOH in water (56.56 g) and additional de-ionized water (776.87 g) were added over a period of 5 minutes to give a 70% neutralized polyurethane resin in water. This was allowed to stir and cool to room temperature to provide a polyurethane dispersion with 27.49% of solids and a measured acid number of 79.03 mg KOH/gram polymer.

Preparation of Pigmented Magenta Dispersion

A Magenta pigmented dispersion was prepared using PR-269 and Polyurethane 1 as a dispersant according to methods disclosed in WO2012/009408.

The pigment dispersion was purified using an ultrafiltration process to remove co-solvent(s) and excess dispersant, and filter out other impurities that may be present. After completion, the pigment level in the dispersion was reduced to 10 to 15%. A magenta dispersion was prepared using the dispersant Polyurethane 1.

| Pigmented Dispersion | Pigment | Pigment/Dispersant | Dispersant | Particle Size D50 (nm) | D95 (nm) |
|---|---|---|---|---|---|
| Magenta | Magenta Pigment | 4 | Polyurethane 1 | 107 | 185 |

Preparation of Cross-linked Pigment Dispersion XL-Magenta

In the cross-linking step, Denacol® 321 was mixed with one of the pigmented Dispersion magenta, and heated at temperatures between 60° C. and 80° C. with efficient stirring for 6-8 hours. After the cross-linking reaction was completed, the pH was adjusted to at least about 8.0 if needed. The composition of the cross-linked Pigment Dispersion magenta is summarized below.

| Cross-linked Dispersion | Pigmented Dispersion | Cross-linkable Moiety | Cross-linking Compound |
|---|---|---|---|
| XL-Magenta | Magenta | COOH, OH | Denacol ® 321 |

After the ultrafiltration and crosslinking step, the pigment to bound dispersant was 5.3. The free polymer dispersant/pigment was less than 0.02.

Preparation of Pigmented Cyan Dispersion

A Cyan pigmented dispersion was prepared using CI PB 15:3 Cyan and Polyurethane 1 as a dispersant according to methods disclosed in WO2012/009408.

The pigment dispersion was purified using an ultrafiltration process to remove co-solvent(s) and excess dispersant, and filter out other impurities that may be present. After completion, the pigment level in the dispersion was reduced to between 10 and 15%. This dispersion was cross-linked in an analogous manner as the previously disclosed Magenta above.

Properties of Binders 1-13 are listed in Tables 1A and 1B below.

TABLE 1A

| Binder No. | Chemical Description | Calculated Acid Number (AN) | % solids | surface tension (dynes/cm) | Acid Number |
|---|---|---|---|---|---|
| 1 | 14IPDI/HQEE 80 AN APIZ | 80 | 27.44% | | |
| 2 | 14IPDI/HEPS 80 AN APIZ | 80 | 31.81% | | |
| 3 | 14IPDI/T650 80 AN APIZ | 80 | 27.43% | | |
| 4 | 14IPDI/T650 10% DEA 45 AN APIZ | 45 | 25.93% | 43.16 | |
| 5 | 14IPDI/T1000 60AN APIZ | 60 | 22.05% | 42.3 | 67.9 |
| 6 | 14TDI/T650 D400 61AN APIZ | 61 | 22.16% | 40.64 | |
| 7 | 6IPDI/T650 25% DEA 60 AN APIZ | 60 | 24.98% | 41.93 | 60.0 |
| 8 | 14TDI/T650 D230 61AN APIZ | 61 | 22.48% | 43.31 | |
| 9 | 14TMXDI/DDS T650 70AN APIZ | 70 | 30.46% | 42.49 | |
| 10 | 14TMXDI/DDS D230 70AN APIZ | 70 | 29.99% | 44.76 | |
| 11 | 14TMXDI/HEPS 56AN APIZ | 56 | 27.79% | 26.56 | |
| 12 | 14IPDI/GC-APIZ diol T650 80 AN APIZ Diol from Glycerin Carbonate and Aminopropyl imidazole (GC-APIZ diol) | | 27.43% | | |
| 13 | IPDI/HEPS T650 APIZ 68AN | | 26.87 | | |

TABLE 1B

| Binder No. | pH | Viscosity (cP) | Mn GPC | GPC MW Polydispersity |
|---|---|---|---|---|
| 1 | 12.0 | 253.1 | 6151 | 2.07 |
| 2 | 11.9 | 809.8 | 6416 | 1.89 |
| 3 | 8.8 | 130.2 | | |
| 4 | 10.4 | 26.2 | 8241 | 2.92 |
| 5 | 10.5 | 7.1 | 53.55 | 2.33 |
| 6 | 9.1 | 412.9 | | |
| 7 | 13.0 | 46.9 | 7220 | 3.43 |
| 8 | 9.1 | 49.0 | 6987 | 2.39 |
| 9 | 9.3 | 111.0 | 4414 | 1.70 |
| 10 | 11.0 | 62.0 | | |
| 11 | 9.2 | 2509.0 | 3862 | 1.74 |
| 12 | 8.8 | 130.2 | | |
| 13 | 11.88 | 45 | 6328 | 2.3 |

Inks 1-2 using Binders 6 and 11, and a Control Ink without any binder were prepared using the magenta crosslinked dispersion described above and ingredients listed below in Table 2.

TABLE 2

| Ingredients | Control Ink 1 | Ink 1 | Ink 2 |
|---|---|---|---|
| Magenta Pigment | 4.20% | 4.20% | 4.20% |
| Binder 6 | 0.00% | 0.80% | 0.00% |
| Binder 11 | 0.00% | 0.00% | 0.80% |
| 1 (2-hydroxyethyl)-2-pyrrolidone | 8.00% | 8.00% | 8.00% |
| Tetraethylene Glycol | 3.00% | 3.00% | 3.00% |
| 1,6-hexanediol | 3.00% | 3.00% | 3.00% |
| 2-pyrrolidone | 8.50% | 8.50% | 8.50% |
| LEG-1 (Glycereth 26) | 2.00% | 2.00% | 2.00% |
| Proxel GXL | 0.10% | 0.10% | 0.10% |
| Surfynol SEF | 0.40% | 0.40% | 0.40% |
| Zonyl FSO | 0.10% | 0.10% | 0.10% |
| De-ionized Water | Balance to 100% | | |

The above inks were printed using an Espon B310 printer in "Text and Image" mode (Single pass). The substrate were Xerox 4200 paper, HPMP (multipurpose), and HP Bright White. The optical densities and optical saturation properties of Inks 1-2 and Comparative Ink were listed in Table 3 below.

TABLE 3

| Paper | Control Ink 1, OD | Control Ink 1, Saturation | Ink 1, OD | Ink 1, Saturation | Ink 2, OD | Ink 2, Saturation |
|---|---|---|---|---|---|---|
| Xerox 4200 | 0.84 | 0.99 | 0.83 | 0.99 | 0.83 | 0.97 |
| HPMP | 0.92 | 1.13 | 0.93 | 1.15 | 0.93 | 1.14 |
| HP Bright White | 0.93 | 1.14 | 0.96 | 1.19 | 0.93 | 1.14 |
| HP Brochure | 0.99 | 1.27 | 1.01 | 1.30 | 1.03 | 1.32 |

Results of highlighter durability test are summarized in Table 4 below.

TABLE 4

| | Paper | | Paper | |
|---|---|---|---|---|
| Ink | 10 min Rating^ | 1 hr Rating^ | 10 min Rating^ | 1 hr Rating^ |
| | Xerox 4200 | | HP MP | |
| Control Ink 1 | 4.5 | 4 | 4 | 4.5 |
| Ink 1 | 5 | 5 | 5 | 5 |
| Ink 2 | 5 | 5 | 5 | 5 |
| | HP BriteWhite | | HP Brochure | |
| Control Ink 1 | 4.5 | 4.5 | 5 | 5 |
| Ink 1 | 4.5 | 5 | 5 | 5 |
| Ink 2 | 4 | 5 | 5 | 5 |

^Visual Rating for Highlighter Smear:
0 - Ink largely removed from stripe with highlighter
1 - Severe smear, considerable color transfer, may be some damage to stripe
2 - Noticeable smear, run full width of area between stripes
3 - Moderate smear, may be full width of highlighter, but light in color
4 - Slight smear, narrow, doesn't run clear to next stripe
5 - No smear visible Results of a durability smudge test are summarized in Table 5 below.

TABLE 5

| | Paper | | Paper | |
|---|---|---|---|---|
| Ink | 10 min Rating* | 1 hr Rating* | 10 min Rating* | 1 hr Rating* |
| | Xerox 4200 | | HP MP | |
| Control Ink 1 | 4 | 4 | 3.5 | 3.5 |
| Ink 1 | 3.5 | 4 | 3 | 3 |
| Ink 2 | 3.5 | 3.5 | 3 | 3 |
| | HP BriteWhite | | HP Brochure | |
| Control Ink 1 | 4 | 4 | 2 | 3 |
| Ink 1 | 3 | 3 | 3.5 | 3.5 |
| Ink 2 | 3 | 3 | 3.5 | 3.5 |

*Visual Rating for Smudge Smear:
0 - Ink largely removed from stripe with highlighter
1 - Severe smear, considerable color transfer, may be some damage to stripe
2 - Noticeable smear, run full width of area between stripes
3 - Moderate smear, may be full width of highlighter, but light in color
4 - Slight smear, narrow, doesn't run clear to next stripe Similar to the preparation of Inks 1-2, Inks 3-4 were prepared using the cross-linked cyan dispersion described above and a standard ink vehicle containing humectants and surfactants as shown in Table 6 below. Also prepared was Control ink 2 without the presence of any binder.

TABLE 6

| | Ink | | |
|---|---|---|---|
| | Control Ink 2 | Ink 3 | Ink 4 |
| Crosslinked IPDI/PE/80AN/BMEA cyan dispersion | 4.0 | 4.0 | 4.0 |
| Binder 2 | 0 | 0.4 | 0 |
| Binder 13 | 0 | 0 | 0.4% |
| Ink Vehicle | 25% | 25% | 25% |
| De-ionized Water | Balance to 100% | | |

Control Ink 2 and Inks 3-4 were printed using an HP 8000 printer. The OD and saturation properties are summarized in Table 7 below.

TABLE 7

| Ink | Xerox 4200 | HP Multipurpose | HP Bright White | HP Brochure | Staples |
|---|---|---|---|---|---|
| | | | OD | | |
| Control Ink 2 | 1.01 | 1.10 | 1.12 | 1.56 | 0.96 |
| Ink 3 | 0.93 | 1.10 | 1.16 | 1.49 | 0.89 |
| Ink 4 | 0.95 | 1.12 | 1.18 | 1.54 | 0.91 |
| | | | Saturation | | |
| Control Ink 2 | 0.95 | 1.08 | 1.10 | 1.28 | 0.90 |
| Ink 3 | 0.85 | 1.05 | 1.12 | 1.22 | 0.82 |
| Ink 4 | 0.87 | 1.08 | 1.13 | 1.25 | 0.84 |

Results of a highlighter durability test are summarized in Table 8 below.

TABLE 8

| | 2-Pass highlighter Smear (10 minutes)^ | | | | |
|---|---|---|---|---|---|
| Ink | Xerox 4200 | HP Multipurpose | HP Bright White | HP Brochure | Staples |
| Control Ink 2 | 5 | 4 | 4 | 5 | 5 |
| Ink 3 | 5 | 4 | 4 | 5 | 5 |
| Ink 4 | 5 | 4 | 4 | 5 | 5 |

^see definition above

Results of a durability smudge test are summarized in Table 9 below.

TABLE 9

| | Smudge (10 minutes)* | | | | |
|---|---|---|---|---|---|
| Ink | Xerox 4200 | HP Multipurpose | HP Bright White | HP Brochure | Staples |
| Control Ink 2 | 4 | 3 | 3 | 1 | 4 |
| Ink 3 | 4 | 3 | 3 | 4 | 4 |
| Ink 4 | 4 | 3 | 3 | 4 | 4 |

*see definition above

What is claimed is:

1. An aqueous inkjet ink comprising a colorant, an aqueous vehicle, and a polyurethane ink additive as a binder, wherein said polyurethane additive comprises at least one compound of the general structure of Formula I:

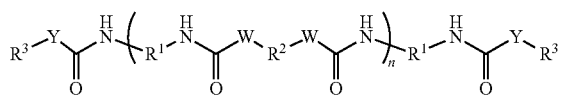

(I)

each Y is independently O, S or $NR^4$;
each W is N, O or S;
n is an integer from 2 to 30;
each $R^1$ is independently $C_1$-$C_{20}$ alkyl optionally substituted with one or more $R^5$, $OR^6$, $SR^6$ or $NR^7R^8$, or $C_6$-$C_{40}$ aryl optionally substituted with one or more $R^5$, $OR^6$, $SR^6$ or $NR^7R^8$;

each $R^2$ is comprised of difunctional isocyanate reactants $Z^1$, $Z^2$ and $Z^3$, wherein $Z^1$ is a difunctional isocyanate reactant substituted with an aqueous dispersing ionic group, and $Z^1$ is present in between 5 to 40 weight percent of total weight of the polyurethane dispersant;

$Z^2$ is a difunctional or trifunctional isocyanate reactant selected from the group consisting of diol, diamine, amino alcohol, diamino alcohol, and amino dialcohol, and $Z^2$ is present in between 0 to 40 weight percent of total weight of the polyurethane dispersant; and $Z^3$ is a difunctional isocyanate reactant substituted with $R^3$, and $Z^3$ is present in between 5 to 40 weight percent of total weight of the polyurethane dispersant; and each $R^3$ is independently a monocylic or bicyclic heterocycle containing N, S or O atoms on the ring bonding via a carbon or heteroatom to Y or $Z^2$ either directly or via a linking group containing 1-10 carbon atoms, wherein said heterocycle is selected from the group consisting of imidazole, imidazolidinone, oxazolidinone, thiazolidinone, benzotriazole, benzimidazole, triazole, benzotriazole, thiazole, benzothiazole, pyrimidine, pyridazine, pyrrolidone and glycoside, and wherein the carbon atoms on the ring of said heterocycle are optionally substituted with one or more $R^5$, $OR^6$, $SR^6$ or $NR^7R^8$, and the N atom or atoms on the ring of said heterocycle are optionally substituted with $R^5$ or —$R^9OR^6$;

each $R^5$ is independently $C_1$-$C_{20}$ alkyl, $C_3$-$C_{20}$ cycloalkyl or $C_6$-$C_{40}$ aryl;

each $R^6$ is independently H, $C_1$-$C_{20}$ alkyl, $C_3$-$C_{20}$ cycloalkyl or $C_6$-$C_{40}$ aryl; and each $R^7$ and $R^8$ are independently H, $C_1$-$C_{20}$ alkyl, $C_3$-$C_{20}$ cycloalkyl or $C_6$-$C_{40}$ aryl;

and each $R^9$ is $C_1$-$C_5$ alkyl.

2. The ink of claim 1 wherein $R^2$ further comprises $Z^4$, and $Z^4$ is a difunctional or trifunctional isocyanate reactant selected from the group consisting of a diol that contains a sulfone and a diamine that contains a sulfone.

3. The ink of claim 1 wherein said polyurethane ink additive has an acid number (mg KOH per gram solid polymer) of at least 10 and at most 250.

4. The ink of claim 1, wherein said polyurethane ink additive has a number average molecular weight of between 2,000 and 30,000 daltons.

5. The ink of claim 1 wherein said colorant is a pigment.

6. The ink of claim 1 wherein said colorant is a dispersed dye.

7. The ink of claim 5 wherein said colorant is a self-dispersed pigment.

8. The ink of claim 7 wherein said self-dispersed pigment comprises anionic hydrophilic groups.

9. The ink of claim 1 wherein said anionic hydrophilic groups are carboxyl groups.

10. The aqueous pigment dispersion of claim 1 wherein $R^3$ is independently a monocylic or bicyclic heterocycle.

11. The ink of claim 1 wherein said heterocycle is oxazolidinone.

12. The ink of claim 1 wherein said heterocycle is imidazole.

13. The ink of claim 1 wherein said heterocycle is imidazolidinone.

14. The ink of claim 1 wherein said heterocycle is thiazole.

15. The ink of claim 1 wherein said heterocycle is pyrimidine.

16. The ink of claim 1 wherein said heterocycle is pyridazine.

17. The ink of claim 1 wherein said heterocycle is glycoside.

18. The ink of claim 1 wherein said heterocycle is pyrrolidone.

19. An inkjet ink set wherein at least one of the inks in the inkjet ink set is comprised of a colorant, an aqueous vehicle, and a polyurethane ink additive as a binder, wherein said polyurethane additive comprises at least one compound of the general structure of Formula I:

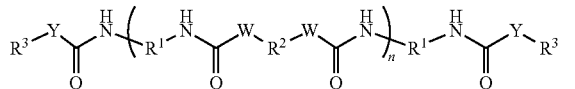

each Y is independently O, S or $NR^4$;
each W is N, O or S;
n is an integer from 2 to 30;
each $R^1$ is independently $C_1$-$C_{20}$ alkyl optionally substituted with one or more $R^5$, $OR^6$, $SR^6$ or $NR^7R^8$, or $C_6$-$C_{40}$ aryl optionally substituted with one or more $R^5$, $OR^6$, $SR^6$ or $NR^7R^8$;
each $R^2$ is comprised of difunctional isocyanate reactants $Z^1$, $Z^2$ and $Z^3$, wherein
$Z^1$ is a difunctional isocyanate reactant substituted with an aqueous dispersing ionic group, and $Z^1$ is present in between 5 to 40 weight percent of total weight of the polyurethane dispersant;
$Z^2$ is a difunctional or trifunctional isocyanate reactant selected from the group consisting of diol, diamine, amino alcohol, diamino alcohol, and amino dialcohol, and $Z^2$ is present in between 0 to 40 weight percent of total weight of the polyurethane dispersant; and
$Z^3$ is a difunctional isocyanate reactant substituted with $R^3$, and $Z^3$ is present in between 5 to 40 weight percent of total weight of the polyurethane dispersant; and each $R^3$ is independently a monocylic or bicyclic heterocycle containing N, S or O atoms on the ring bonding via a carbon or heteroatom to Y or $Z^2$ either directly or via a linking group containing 1-10 carbon atoms, wherein said heterocycle is selected from the group consisting of imidazole, imidazolidinone, oxazolidinone, thiazolidinone, benzotriazole, benzimidazole, triazole, benzotriazole, thiazole, benzothiazole, pyrimidine, pyridazine, pyrrolidone and glycoside, and wherein the carbon atoms on the ring of said heterocycle are optionally substituted with one or more $R^5$, $OR^6$, $SR^6$ or $NR^7R^8$, and the N atom or atoms on the ring of said heterocycle are optionally substituted with $R^5$ or $—R^9OR^6$;
each $R^5$ is independently $C_1$-$C_{20}$ alkyl, $C_3$-$C_{20}$ cycloalkyl or $C_6$-$C_{40}$ aryl;
each $R^6$ is independently H, $C_1$-$C_{20}$ alkyl, $C_3$-$C_{20}$ cycloalkyl or $C_6$-$C_{40}$ aryl; and
each $R^7$ and $R^8$ are independently H, $C_1$-$C_{20}$ alkyl, $C_3$-$C_{20}$ cycloalkyl or $C_6$-$C_{40}$ aryl;
and each $R^9$ is $C_1$-$C_5$ alkyl.

20. A method of inkjet printing onto a substrate comprising, in any workable order, the steps of:
(e) providing an inkjet printer that is responsive to digital data signals;
(t) loading the printer with a substrate to be printed;
(g) loading the printer with the ink of claim 1; and
(h) printing onto the substrate using the ink in response to the digital data signals to form a printed image on the substrate.

21. A method of inkjet printing onto a substrate comprising, in any workable order, the steps of:
(e) providing an inkjet printer that is responsive to digital data signals;
(t) loading the printer with a substrate to be printed;
(g) loading the printer with the ink set of claim 19; and
(h) printing onto the substrate using the ink set in response to the digital data signals to form a printed image on the substrate.

* * * * *